3,157,626
PREPARATION OF CRYSTALLINE POLY(VINYL ALKYL ETHERS) WITH A CATALYST FORMED FROM A TRANSITION METAL FLUORIDE AND A METAL ALKOXIDE
Richard F. Heck, Wilmington, Del., assignor to Hercules Powder Company, Wilmington, Del., a corporation of Delaware
No Drawing. Filed Dec. 27, 1960, Ser. No. 78,313
4 Claims. (Cl. 260—91.1)

This invention relates to a new process for the production of poly(vinyl ethers) of high molecular weight and high crystallinity.

It is well known that vinyl ethers may be polymerized in bulk or solution with Friedel-Crafts catalysts to yield polymers that vary from viscous liquid to balsamlike or soft resinouslike polymers. Under certain conditions and using boron trifluoride etherates as catalysts it has been possible to produce a crystalline type of poly(vinyl methyl ether) and poly(vinyl isobutyl ether), but in both cases the polymers have high solubilities. Thus, in the case of the crystalline-type poly(vinyl methyl ether) of the prior art the polymer is completely soluble in cold water and in organic solvents such as methanol, ethanol, acetone, and benzene. Accordingly, the utility of these prior art poly(vinyl ethers) has been considerably limited.

Now, in accordance with this invention it has been found that vinyl alkyl ethers can be polymerized to high molecular weight, crystalline polymers by using as the catalyst for the polymerization a fluoride of a metal selected from Groups IV–B, V–B, and VIII of the Periodic Table (Lange, Handbook of Chemistry, 8th edition, pages 56–57, published 1952), in combination with an alkoxide of a metal selected from Groups II–A, II–B, III–A, IV–A, IV–B, V–B, VI–B, and VIII of the Periodic Table. The polyethers so produced are high molecular weight, highly crystalline polymers that are capable of being formed into strong, orientable fibers and films.

Just what the catalyst species is when a vinyl ether is polymerized with a fluoride of one of the specified metals used in combination with a metal alkoxide is not known.

Any of the above-specified metals, including substituted alkoxides such as acetylacetonates, can be combined with a transition metal fluoride to produce the catalyst used in accordance with the invention. Examplary of these metal alkoxides are: aluminum methoxide, ethoxide, propoxide, isopropoxide, butoxide, tert-butoxide, n-octoxide, etc.; aluminum acetylacetonate; titanium ethoxide, isopropoxide, and the corresponding gallium, indium, tin, vanadium, zirconium, etc., alkoxides in which all valences of the metal are satisfied by alkoxide groups.

Examplary of the metal fluorides which can be used in combination with the metal alkoxides are titanium tetrafluoride, zirconium tetrafluoride, vanadium pentafluoride, vanadium trifluoride, ferric fluoride, cobaltic fluoride, cobaltous fluoride, etc. Most preferably the metal of the metal fluoride will be in its highest valance state.

The fluoride and the metal alkoxide can be premixed and used in the polymerization reaction or they can be mixed in situ. Preferably, they are mixed in an inert, anhydrous, liquid, organic diluent at a temperature of from about −100° C. to about 150° C. and then used as such alone or with an additional amount of the metal alkoxide for the polymerization. For example, excellent results have been obtained when a small quantity of the metal alkoxide is first added to the vinyl ether to be polymerized, whereby any traces of impurities such as water, acid, etc., are removed, and then the premixed catalyst combination is added. In some cases it is advantageous to age the catalyst combination either at the mixing temperature or at a higher temperature. Whether the catalyst combination should be aged, and under what conditions, will, of course, depend upon the specific components being used.

The amount of the catalyst used for the polymerization of the vinyl ethers can vary from a minor catalytic amount to a large excess, but generally will be an amount such that the amount of fluoride used in the catalyst combination will be within the range of from about 0.001 mole of metal fluoride per mole of monomer to about 0.05 mole of metal fluoride per mole of monomer. The mole ratio of the metal fluoride to the metal alkoxide can also be varied over a wide range but preferably will be from about 0.01:1 to about 10:1.

Any vinyl alkyl ether can be polymerized or copolymerized with the above-described catalyst combination in accordance with this invention, as, for example, vinyl methyl ether, propenyl methyl ether, vinyl ethyl ether, propenyl ethyl ether, vinyl propyl ether, propenyl propyl ether, vinyl isopropyl ether, vinyl n-butyl ether, vinyl isobutyl ether, vinyl tert-butyl ether, vinyl neopentyl ether, vinyl 2-chloroethyl ether, vinyl 2-methoxyethyl ether, vinyl trifluoroethyl ether, 1-methoxybutadiene, etc.

The polymerization can be carried out with or without a diluent, but for ease of operation, separation of the catalyst from the polymer, etc., it is generally carried out in an inert diluent. Any anhydrous, liquid, organic diluent that is inert under the reaction conditions can be used, as, for example, aliphatic, cycloaliphatic, or aromatic hydrocarbons, chlorinated hydrocarbons, ethers, esters, etc. Exemplary of such diluents are hexane, heptane, cyclohexane, benzene, toluene, xylene, etc., or a mixture of such hydrocarbons, methylene chloride, chloroform, carbon tetrachloride, ethylene dichloride, chlorobenzene, diethyl ether, diisopropyl ether, ethyl acetate, etc.

The selection of the temperature and pressure used for the polymerization process will depend upon the activity of the specific catalyst being used, the diluent used, etc. In general, the polymerization will be carried out at a temperature within the range of from about −100° C. to about 200° C., and preferably from about −80° C. to about 100° C. In the same way, while atmospheric pressure or a pressure of only a few pounds can be used, the polymerization can be carried out under a wide range of pressures, as, for example, from a partial vacuum to about 1000 pounds, and preferably from about atmospheric to about 500 pounds pressure. Higher pressures can, of course, be used, but generally do not appreciably alter the course of the polymerization.

When the polymerization is carried out as described above, the polymer is readily isolated from the solution or slurry of polymer and diluent by simply removing the diluent by evaporation, filtration, or other such means. The polymer can then be purified to remove the catalyst residues by washing with an alcoholic or aqueous solution of acid or base or by dissolving the polymer in a suitable solvent, filtering to remove the insoluble catalyst and then separating the polymer from the so-purified solution. Frequency it is desirable to add a stabilizer such as 4,4'-thiobis(6-tert-butyl-m-cresol), di-tert-butyl-p-cresol, etc., to protect the polymer during storage or during use under adverse conditions.

In many cases the polymers produced in accordance with this invention are mixtures of highly crystalline polymers with amorphous or slightly crystalline polymers. In order to obtain a high solvent resistance and high tensile strength it is generally advisable to remove any amorphous polymer which is present. Sometimes it is also advisable to remove slightly crystalline polymer. This is readily done by washing the polymer with a solvent which dissolves the slightly crystalline and amorphous product, but which does not dissolve the highly crystalline product.

The following examples will illustrate the process of polymerizing vinyl ethers in accordance with this invention to high molecular weight, highly crystalline polymers. The molecular weight of the polymers produced in these examples is indicated by the Reduced Specific Viscosity (RSV) given for each. By the term "Reduced Specific Viscosity" is meant the $\eta$ sp./C. determined on an 0.1% solution (0.1 g. of the polymer per 100 ml. of solution) of the polymer in chloroform at 25° C. All parts and percentages are by weight unless otherwise indicated.

*Example 1*

The catalyst used in this example was prepared by mixing a slurry of 0.026 part of titanium tetrafluoride in n-heptane with a solution of 0.568 part of titanium tetraisopropoxide in n-heptane and the mixture shaken with glass beads for one hour at room temperature.

A polymerization vessel was filled with nitrogen and charged with 10 parts of vinyl methyl ether, 60 parts of methylene chloride, and 0.284 part of titanium tetraisopropoxide as an activator. After equilibrating the vessel and contents at 0° C., the above-described premixed catalyst was added. The reaction mixture was then agitated at 0° C. for two hours and then at 25° C. for 16 hours. At this time the catalyst was destroyed by adding 2 parts of a 1 M solution of ammonia in ethanol. To the reaction mixture was then added 2 parts of a 1% solution of 4,4'-thiobis(6-tert-butyl-m-cresol) in ethanol as a stabilizer and the diluent removed under vacuum. The crude polymer was extracted several times with methanol to separate the methanol-insoluble, highly crystalline polymer from the methanol-soluble amorphous or slightly crystalline polymer. The methanol-insoluble, highly crystalline polymer fraction amounted to 66% of the total and had an RSV of 3.5.

*Example 2*

The catalyst used in this example was prepared prior to its use in the polymerization as described in Example 1. The catalyst components were 0.05 part titanium tetrafluoride and 0.078 part aluminum triisopropoxide. Vinyl methyl ether was polymerized and isolated as described in Example 1, except that the catalyst combination was added in two equal portions, one at the beginning of the reaction and the second portion one hour later. The methanol-insoluble, highly crystalline polymer fraction amounted to 70% of the total and had an RSV of 4.4.

What I claim and desire to protect by Letters Patent is:
1. The process of polymerizing vinyl alkyl ethers which comprises contacting at least one of said ethers with a catalyst formed by mixing a fluoride of a metal selected from the group consisting of titanium, zirconium, vanadium, iron, and cobalt with an alkoxide of a metal selected from the group consisting of aluminum, titanium, gallium, indium, tin, vanadium, and zirconium in which alkoxides all valences of the metal are satisfied by alkoxide groups having 1 to 8 carbon atoms.

2. The process of claim 1 wherein the vinyl alkyl ether is vinyl methyl ether.

3. The process of claim 2 wherein the catalyst is that formed by mixing titanium tetrafluoride with an aluminum trialkoxide.

4. The process of claim 2 wherein the catalyst is that formed by mixing titanium tetrafluoride with a titanium tetraalkoxide.

References Cited in the file of this patent

UNITED STATES PATENTS

| | | |
|---|---|---|
| 2,910,461 | Nowlin et al. | Oct. 27, 1959 |
| 2,930,785 | Edmonds | Mar. 29, 1960 |
| 2,935,500 | Nowlin et al. | May 3, 1960 |
| 2,943,063 | Eby et al. | June 28, 1960 |
| 3,023,198 | Nowlin et al. | Feb. 27, 1962 |

FOREIGN PATENTS

| | | |
|---|---|---|
| 841,236 | Great Britain | July 13, 1960 |
| 571,741 | Italy | Apr. 15, 1958 |